(12) United States Patent
Van Den Biggelaar et al.

(10) Patent No.: US 12,120,794 B2
(45) Date of Patent: Oct. 15, 2024

(54) LIGHTING ARRANGEMENT WITH INTEGRATED SENSING SUCH AS LIGHT SENSING

(71) Applicant: SIGNIFY HOLDING B.V., Eindhoven (NL)

(72) Inventors: Theodorus Johannes Petrus Van Den Biggelaar, Eindhoven (NL); Anteneh Alemu Abbo, Eindhoven (NL); Marco Haverlag, Eindhoven (NL); Bernardus Johannes Pronk, Eindhoven (NL); Matthias Wendt, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 99 days.

(21) Appl. No.: 17/795,800

(22) PCT Filed: Jan. 26, 2021

(86) PCT No.: PCT/EP2021/051725
§ 371 (c)(1),
(2) Date: Jul. 27, 2022

(87) PCT Pub. No.: WO2021/156102
PCT Pub. Date: Aug. 12, 2021

(65) Prior Publication Data
US 2023/0108925 A1  Apr. 6, 2023

(30) Foreign Application Priority Data
Feb. 6, 2020 (EP) .................................... 20155911

(51) Int. Cl.
*H05B 47/11* (2020.01)
*G01J 1/42* (2006.01)
*G01J 1/44* (2006.01)
*H05B 45/14* (2020.01)

(52) U.S. Cl.
CPC ............ *H05B 47/11* (2020.01); *G01J 1/4204* (2013.01); *G01J 1/44* (2013.01); *H05B 45/14* (2020.01)

(58) Field of Classification Search
None
See application file for complete search history.

(56) References Cited

U.S. PATENT DOCUMENTS

| 2012/0153153 | A1* | 6/2012 | Chang | G01C 3/08 |
| | | | | 250/214.1 |
| 2012/0319586 | A1* | 12/2012 | Riesebosch | H05B 45/12 |
| | | | | 315/121 |
| 2014/0062297 | A1 | 3/2014 | Bora et al. | |
| 2014/0361693 | A1 | 12/2014 | Angelin et al. | |
| 2016/0234907 | A1* | 8/2016 | Joseph | H05B 45/22 |
| 2017/0034888 | A1* | 2/2017 | Verma | H05B 47/11 |
| 2018/0160508 | A1* | 6/2018 | Gabai | H05B 45/10 |

FOREIGN PATENT DOCUMENTS

WO    2016169961 A1    10/2016

\* cited by examiner

*Primary Examiner* — Wei (Victor) Y Chan

(57) ABSTRACT

A lighting arrangement has a lighting module with a sensor element in parallel with a light source arrangement between module terminals. A measuring system is provided for measuring, at the module terminals, a signal which is dependent on the sensor element when the light source arrangement is turned off. Thus, sensing is integrated into or connected to a lighting module, such as LED module.

19 Claims, 5 Drawing Sheets

LIGHTING ARRANGEMENT WITH INTEGRATED SENSING SUCH AS LIGHT SENSING

CROSS-REFERENCE TO PRIOR APPLICATIONS

This application is the U.S. National Phase application under 35 U.S.C. § 371 of International Application No. PCT/EP2021/051725, filed on Jan. 26, 2021, which claims the benefit of European Patent Application No. 20155911.9, filed on Feb. 6, 2020. These applications are hereby incorporated by reference herein.

FIELD OF THE INVENTION

This invention relates to lighting arrangements which incorporate a sensing function such as a light sensing function.

BACKGROUND OF THE INVENTION

It is well known to integrate sensing and lighting functions within a luminaire, in particular ambient light sensing.

LEDs are increasingly becoming the standard lighting solution for both domestic and commercial lighting applications. In a typical LED luminaire, the LED devices are mounted on a so-called level two board (L2 board) which is mounted as the light source in the luminaire. A driver connects to the L2 board and converts a mains grid voltage into an appropriate LED current.

In most cases the LEDs on the L2 board are connected in series between the driver output terminals. Sensing elements are typically separately connected, thus requiring separate mounting and wiring, and typically requiring additional contacts to the driver. For ambient light sensing, the light sensors are provided at a dedicated opening in the luminaire such that ambient light can be received. The ambient light sensing is for example used to provide automatic lighting control in dependence on the ambient light conditions.

There is a need for a simplified arrangement to allow ambient light sensing.

SUMMARY OF THE INVENTION

The invention is defined by the claims.

According to examples in accordance with an aspect of the invention, there is provided a lighting arrangement, comprising:
 a lighting module, comprising:
  a terminal arrangement comprising first and second terminals for connection to a lighting driver;
  a light source arrangement in series between the first and second terminals; and
  a sensor element in parallel with the light source arrangement and in series between the first and second terminals; and
 a measuring system for measuring, at the terminal arrangement, a signal which is dependent on the sensor element.

This lighting arrangement combines a light source arrangement and a sensor element such as a light sensitive component, for connection to a driver using the same terminal arrangement. Thus, the additional overhead in implementing a sensing function, e.g. light sensing for automated lighting control, is reduced.

The sensor element is part of a lighting module, whereas the measuring system is for example part of the driver or a separate unit to which the lighting module connects.

The measuring system is for example adapted to monitor the characteristics of a discharge from the light source arrangement through the sensor element when the light source arrangement is turned off.

When turned on, charge will be stored in the light source arrangement. When turned off, resulting in a short moment in time that the light source arrangement is not powered by the lighting driver, this charge is allowed to discharge through the sensor element. For a light sensitive component, the characteristics of this discharge depend on the light level (i.e. the ambient light level, because the light source arrangement is turned off). This provides a simple way to measure the ambient light level using the same terminal arrangement used for driving the light source arrangement.

The measuring system may then comprise a measuring unit and a connection switch for connecting the measuring unit to the terminal arrangement.

The measuring unit is in this way only powered when needed. The measuring unit may measure the voltage between the first and second terminals or it may measure a flowing current.

In one example, the measuring system may be adapted to measure a discharge voltage over time.

The voltage discharge function of a capacitance depends on the resistance through which the capacitance discharges, which may in this case depend on the ambient light level.

In another example, the measuring system is adapted to measure a current over time.

The current discharge function of a capacitance also depends on the resistance through which the capacitance discharges, which may in this case depend on the ambient light level. However, a photo-generated current may also be measured, instead of making use of a light dependent impedance change.

The sensor element may comprise a light sensitive component comprising:
 a light dependent resistor; or
 a phototransistor; or
 a photodiode with the same polarity between the first and second terminals as the light source arrangement; or
 a photodiode with an opposite polarity between the first and second terminals as the light source arrangement.

There are thus different options for implementing the light sensing function. In one set of examples, the impedance of the chosen component varies as function of the incident light, and this alters the way stored energy is discharged from the light source arrangement. In another set of examples, a current flow is generated by incident light.

The lighting arrangement may further comprise an isolating switch in series with the sensor element for disconnecting the sensor element when the light source arrangement is turned on. This reduces the energy consumption of the light sensing function.

The isolating switch is for example controlled by one or more voltages of the terminal arrangement.

This avoids the need for separate control of the isolating switch, in particular because the connection of the lighting module is only to the two terminals of the terminal arrangement.

The isolating switch may comprise:
 a transistor such as a MOSFET; or
 an opto-coupled switch; or
 a relay.

The lighting arrangement may further comprise an amplifier connected to the sensor element and a modulation circuit, such that a modulated amplified sensing signal is provided to the terminal arrangement.

This arrangement enables a more simple measurement function (at the driver side) because the modulated current may simply be read as a voltage across a current sensing resistor.

According to a second aspect, there is provided a lighting arrangement, comprising:
a lighting module, comprising:
a terminal arrangement comprising first and second terminals for connection to a lighting driver;
a light source arrangement in series between the first and second terminals; and
a sensor circuit in parallel with the light source arrangement, the sensor circuit comprising a sensor element, an amplifier and a modulation circuit for applying a modulated sensing signal to the terminal arrangement; and
a measuring system for measuring, at the terminal arrangement, a signal which is dependent on the sensor element from the modulated sensing signal.

This lighting arrangement again enables a sensor element to be read out using a single pair of terminals, which are those used for connection to a driver. In this aspect, the light generation does not need to be interrupted to implement the sensing function, although it is still an option to perform the sensing when there is no light output.

The modulation circuit may comprise a modulation switch for coupling an amplified sensor element signal to the terminal arrangement and a timing circuit for controlling the timing of operation of the modulation switch. Thus, the amplified sensed signal, e.g. an amplified current, may be provided in a pulsed manner to the terminal arrangement. It may then provide a modification to, i.e. modulation of, the current flowing through the light source arrangement. Thus, it provides a modulated load current. This may detected based on current sensing. For example a driver may use the sensed current as a feedback control signal for current regulation and may then detect the modulated changes in current. For example, they may result in changes to local oscillator settings resulting from constant current control.

In all examples, the light source arrangement may comprise a LED arrangement and the lighting driver comprises a LED driver.

In an example, a lighting module according to any of the aforementioned lighting modules is provided and which is for use in any of the aforementioned lighting arrangements.

The lighting module is capable of providing a sensor signal on the terminal arrangement, which can be read out by the lighting driver which is connected to the same terminal arrangement.

In an example, a measuring system according to any of the aforementioned measuring systems is provided and which is for use in any of the aforementioned lighting arrangements.

The LED arrangement may comprise a LED string and a storage capacitor arrangement in parallel with the LED string. The storage capacitor may perform the dual functions of voltage smoothing and storage of a charge to be discharged through the sensor element.

The invention also provides a lighting system, comprising:
a lighting driver; and
a lighting arrangement as defined above, wherein an output of the lighting driver is connectable to the terminal arrangement and wherein the measuring system is part of the lighting driver.

In some examples, the lighting driver comprises:
a first switch for connecting or disconnecting the output of the lighting driver to the terminal arrangement; and
a second switch for connecting or disconnecting the measuring system to the terminal arrangement, wherein the first and second switches are controlled in complementary manner.

Thus, the lighting driver alternates between a light output mode and a light sensing mode.

The lighting driver is for example adapted to control the first and second switches to provide periodic light sensing cycles. The light sensing for example takes place during the off period of a PWM drive signal.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
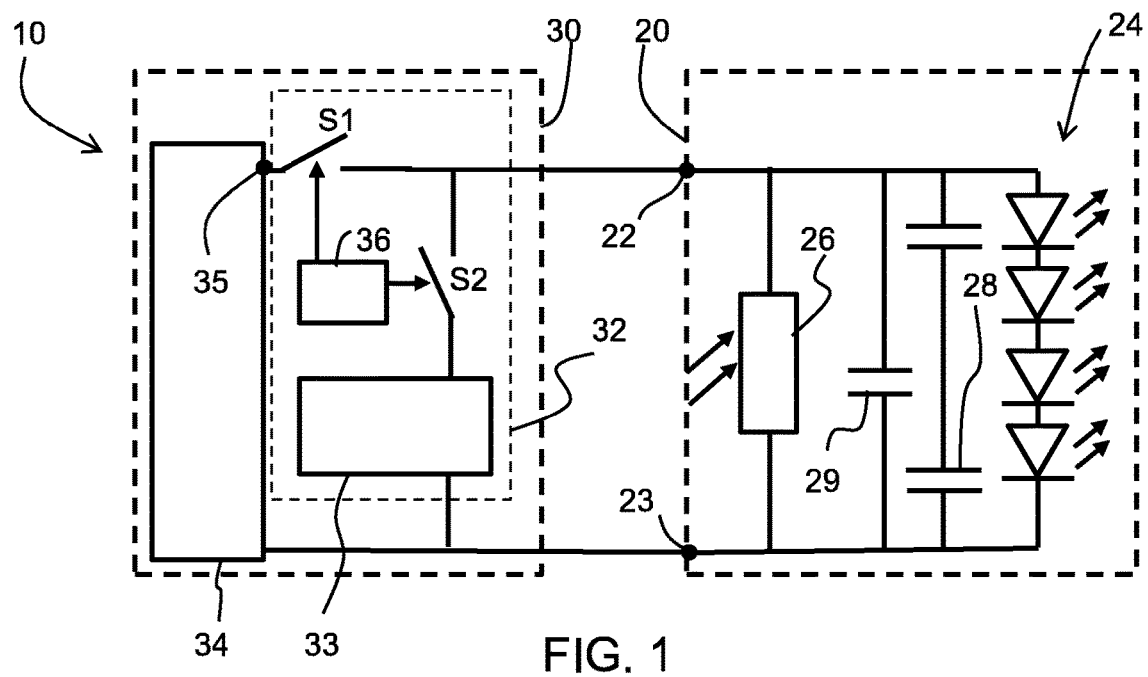
FIG. 1 shows a first example of a lighting arrangement, comprising a lighting module and a lighting driver which includes a measuring system.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lighting arrangement having a lighting module with a sensor element in parallel with a light source arrangement, between module terminals. A measuring system is provided for measuring, at the module terminals, a signal which is dependent on the sensor element when the light source arrangement is turned off. Thus, sensing is integrated into or connected to a lighting module, such as a LED module.

FIG. 1 shows a first example of a lighting arrangement 10, comprising a lighting module 20 and a lighting driver 30 which includes a measuring system 32.

The lighting module 20 comprises a terminal arrangement comprising first and second terminals 22, 23 for connection to the lighting driver 30.

A light source arrangement 24 is in series between the first and second terminals 22, 23, and a sensor element, preferably a light sensitive component 26, is in parallel with the light source arrangement 24.

The light source arrangement is shown as a series string of LEDs, but there may be a series and parallel combination of LEDs, and indeed the invention is applicable more generally to any type of light source.

The light sensitive component 26 for example generates a current in response to incident light, or has an impedance which varies as a function of the incident light. It may comprise a light dependent resistor, a phototransistor, or a photodiode. There are thus different options for implementing the light sensing function. For example, the impedance of the component 26 varies as function of the incident light, and this alters the way stored energy is discharged from the light source arrangement. This stored energy is for example stored in the self-capacitance of the LEDs, represented as capacitors 28, and/or in an additional capacitor 29.

The measuring system 32 is for measuring, at the terminal arrangement of first and second terminals 22, 23, a signal which is dependent on the light sensitive component 26 when the light source arrangement 24 is turned off.

The lighting arrangement thus combines a light source arrangement 24 and a light sensitive component, for connection to a driver using the same terminal arrangement 22, 23. Thus, the additional overhead in implementing light sensing, e.g. for automated lighting control, is reduced.

When the light source arrangement 24 is turned on, charge will be stored in the shown capacitances 28, 29 associated with the light source arrangement. When turned off, this charge is allowed to discharge though the light sensitive component 26. The characteristics of this discharge depend on the light level (i.e. the ambient light level, because the light source arrangement is turned off). This provides a simple way to measure the ambient light level using the same terminal arrangement used for driving the light source arrangement.

FIG. 1 shows one example of measuring system 32, having a first switch S1 in series between a first output 35 of a driver circuit 34 of the lighting driver 30 and the first terminal 22. Thus, when switch S1 is open, the current path through the lighting module 20 is interrupted, and the light source arrangement 24 is turned off.

A second switch S2 of the measuring system 32 is in series with a measuring unit 33 between the first and second terminal 22, 23.

The second switch S2 is a connection switch for connecting the measuring unit 33 to the terminal arrangement. The measuring unit 33 is thus only powered when needed. The measuring unit 33 may measure the voltage between the first and second terminals or it may measure a flowing current.

A controller 36 provides control of the switches S1, S2.

The lighting module 20 has an illumination mode and a sensing mode. In the illumination mode, switch S1 is closed and switch S2 is open. The lighting module 20 (which is the L2 board) is connected to the drive voltage provided at terminal 35 and light is generated. Also, the capacitors 28, 29 are charged.

In the sensing mode, switch S1 is open and switch S2 is closed. The driver voltage is disconnected so no light is generated but the measuring system 32 is used to measure the lighting level.

In a first example, the light sensitive component is a light dependent resistor (LDR) having a resistance which depends on the light level. In such a case, the measuring system may take measurements from the discharge curve of the capacitor voltage.

Depending on the light level, the conductivity of the light dependent component changes and this influences the discharge curve. The LDR for example may have a resistance that varies from the order of MegaOhms in the dark to kiloOhms when illuminated.

In order to minimize the lighting artefact caused by the measurement operation, the measurement duration (when S1 is open and S2 is closed) should be as short as possible and the switching frequency as high as possible.

The response time of an LDR is relatively long, e.g. up to 10 ms fall time for the resistance in response to light applied after darkness, and up to 1 second rise time for the resistance in response to the complete removal of light.

The use of an LDR is thus of particular interest when the light level monitored by the LDR is not substantially influenced by the LED light. This for example will apply when reflecting surfaces (of the LED light) are distant and the daylight level is high. An optical mounting of the LDR and the LED output is then arranged such that no direct light or stray light of the LEDs reaches the LDR. When the LDR is not exposed to the LED light, the recovery time is not an issue and the LDR is exposed to a predominantly constant ambient light level. This ambient light level might be dominated by daylight or the light of other artificial light sources nearby.

Figure 2:
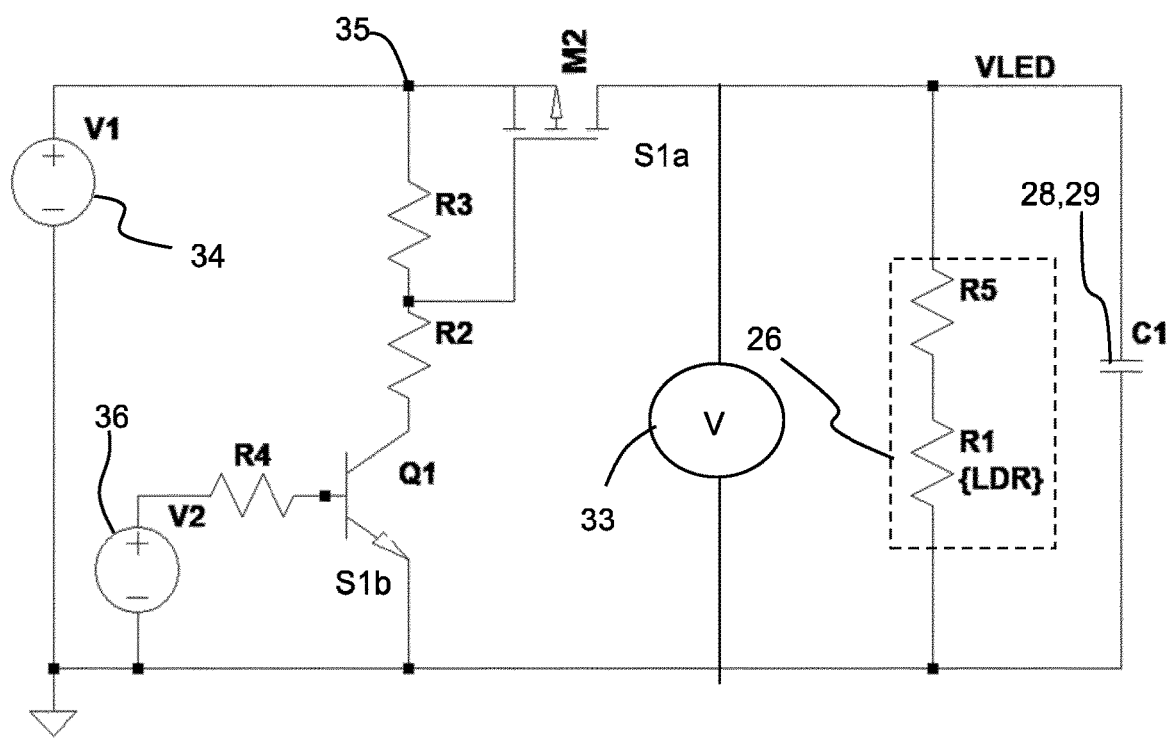
FIG. 2 shows an example of a simulation circuit for implementing the approach explained with reference to FIG. 1.

FIG. 2 shows an example of a simulation circuit for implementing the approach explained with reference to FIG. 1.

The capacitances 28, 29 are represented by a single capacitor C1. The light sensitive component 26 is represented by a fixed resistance R5 and a variable resistance R1. The first switch S1 is implemented by two transistors; MOSFET M2 (switch S1a) and BJT Q1 (switch S1b).

For this simulation, the voltage VLED is monitored continuously as represented by measuring unit 33. The voltage monitoring is thus on the LED side of the switch M2 so that the supply current is removed and the voltage at the capacitor C1 is free to decay.

Control of the switch S1b is by voltage source V2 which applies a pulse waveform to the BJT Q1. The driver circuit 34 is represented by voltage source V1.

When Q1 is turned on, the base voltage of M2 is pulled down so that M2 (which is a p-type device in this circuit) is turned on. Thus, Q1 and M2 implement the switch S1.

By way of example, V1=20V, and V2 has a 1 kHz frequency with a 90% duty cycle. Thus, V2 is high, Q1 is on and M2 is on for 90% of the time. The gate voltage of M2 is pulled down by the resistor divider during this time, so the gate-source voltage of M2 is above the threshold level and M2 is on.

When V2 is low, Q1 is off, and the gate voltage of M2 is equal to the voltage level of the source connection, so M2 is off.

Figure 3:
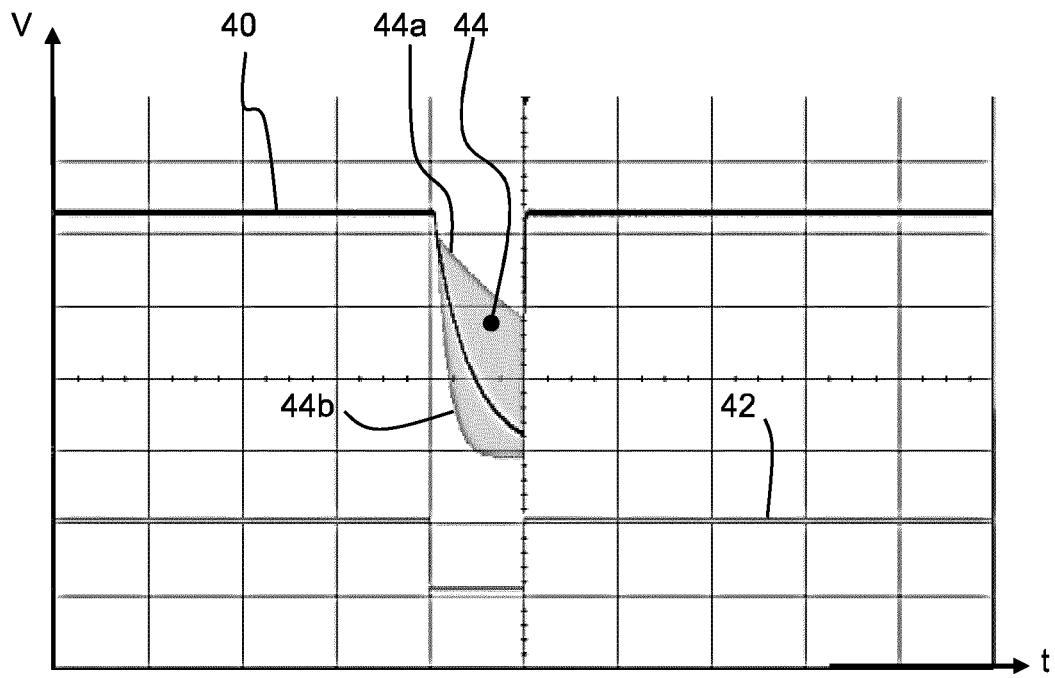
FIG. 3 shows the response of the circuit of FIG. 2 to different light levels.

FIG. 3 shows the response of the circuit to different light levels.

Plot 40 is the voltage across the capacitor C1, i.e. VLED measured by the measuring unit 33, and plot 42 is the switching voltage V2, where S1a is on and S1b is on for a high voltage and S1a is off and S1b is off for a low voltage.

Region 44 shows the range of possible voltage decay functions between dark 44a (high resistance hence large time constant) and maximum brightness 44b (low resistance hence small time constant and rapid voltage decay). During region 44, the light source arrangement 24 is turned off, which means that the light source arrangement 24 does not generate light. The light source can for example be turned off in this region because the voltage across the capacitor C1 drops below a threshold, resulting in a voltage being too low for the light source arrangement 24 to be turned off. This is for example the case when the light source arrangement is an LED module.

Each time division along the x-axis is 0.1 ms. Thus, there is an initial 0.4 ms for driving the LEDs and the next 0.1 ms is the discharge curve depending on the light level.

Thus, by measuring a discharge voltage (of VLED) over time, the light level is measured.

Figure 4:
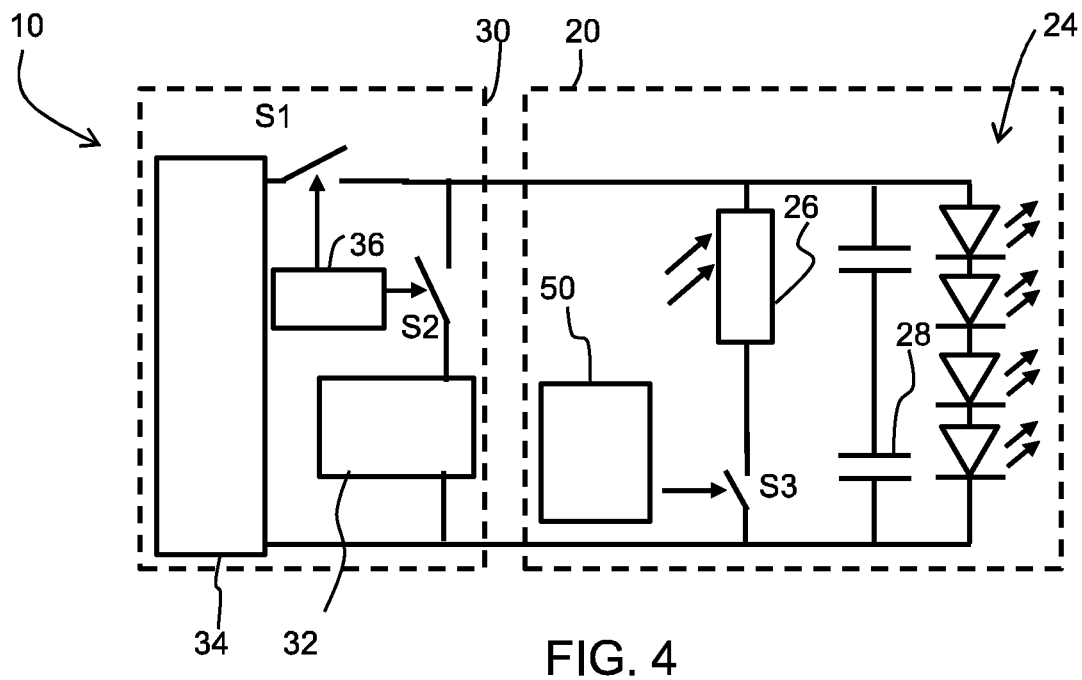
FIG. 4 shows a modification in which an isolating switch is provided in series with a light sensitive component.

FIG. 4 shows a modification in which an isolating switch S3 is provided in series with the light sensitive component 26 for disconnecting the light sensitive component when the light source arrangement is turned on. This reduces the energy consumption of the light sensing function.

The isolating switch S3 is for example controlled by a controller 50. However, this controller may process one or more voltages of the terminal arrangement 22, 23 so that is does not need additional connections to the driver.

Figure 5:
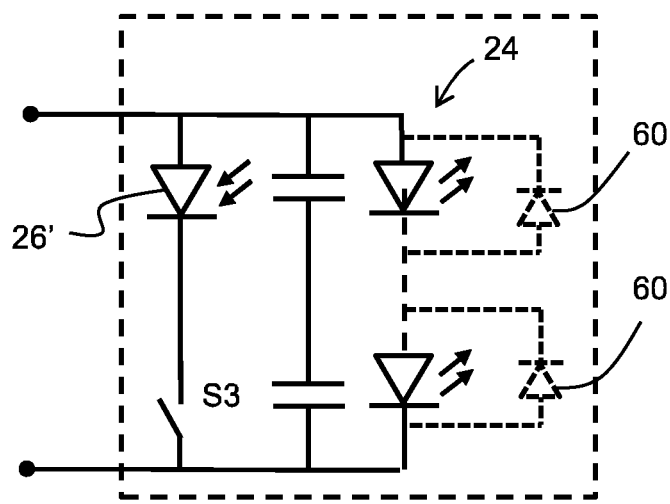
FIG. 5 shows an alternative lighting module design in which the light sensitive component comprises a photodiode.

FIG. 5 shows an alternative lighting module design in which the light sensitive component comprises a photodiode 26'. It has the same polarity as the LEDs between the first and second terminals 22, 23, so that the cathode of the photodiode 26' connects to the cathode the LED string and the anode of the photodiode connects to the anode of the LED string (through the switch S3).

The response time (rise time and fall time) of photodiodes can be designed without the time lag issues discussed above in connection with LDRs. Rise times and fall times in the hundreds of nanoseconds are possible. Thus, they can be used for ambient light sensing even when exposed to the LED light during LED illumination.

In a photovoltaic mode of a photodiode, photocurrent flows out of the anode (i.e. in the reverse direction) through a short circuit to the cathode. This current can be measured to derive information about the light level. If the circuit is opened or has a load impedance, restricting the photocurrent out of the device, a voltage builds up in the direction that forward biases the diode, such that the anode is positive with respect to cathode. Thus, a voltage measurement may also be used as an indication of the light level.

In the photovoltaic mode, a fixed reverse bias voltage may be applied and the current may be measured, or an open circuit may be formed and the photodiode voltage may be measured. The photodiode may be nearly shorted (i.e. with a low resistance coupling between the anode and cathode) and the current may be monitored.

In a photoconductive mode, the photodiode is reverse biased (with the cathode driven positive with respect to the anode). This gives a faster response than the photovoltaic mode, but more noise is measured.

To use the photodiode in the photoconductive mode, a reverse bias voltage is applied during readout. The voltage then shows a linear relation to the light flux if a reasonable reading current is established. The voltage level applied during read out is however selected well below the forward voltage of parallel protection diodes 60.

A fixed reverse bias voltage may be applied and the current measured, or a fixed current may be driven through the photodiode and the voltage measured.

Applying a voltage and measuring the current is the a most direct approach, in that the current is highly light dependent in the so-called photodiode mode (with a reverse bias). However, applying a defined voltage to the photodiode may be impractical, so a preferred option is to apply a fixed voltage to the combination of the photodiode and a series resistor, and to monitor the voltage drop over the resistor. This directly depends on the current flowing due to photons hitting the photodiode.

The switch S3 is needed in this example because at the normal LED driving voltage, the photodiode 26' would be conducting in even in a dark condition. Furthermore, the forward voltage of the LED string is much higher than the forward voltage of the photodiode 26' so that all of the driving current would loop through the photodiode and no current would reach the LEDs.

The switch S3 is disconnected automatically. For example, the switch S3 is adapted to disconnect for a positive applied voltage, and is conducting for a negative applied voltage. The switch S3 may be a transistor such as a MOSFET, or an opto-coupled switch, or a relay may be used.

The switch is preferably designed such that the control current for the switch S3 only flows during the positive polarity the LED drive signal, because this current is provided by the driver and would distort the photodiode current otherwise.

For this example, the driver allows voltage reversal at the output to enable implementation of the sensing mode and the lighting mode. A series resistance may be used to ensure that a reasonable reading current is present.

Figure 6:
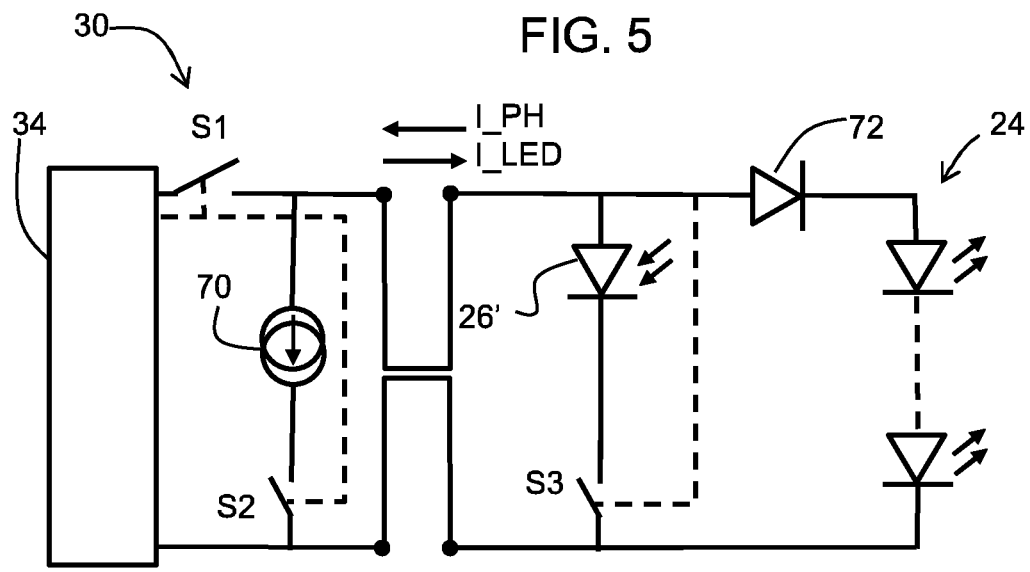
FIG. 6 shows the circuit of FIG. 5 connected to a lighting driver.

FIG. 6 shows the circuit of FIG. 5 connected to a lighting driver 30. The reading current is generated by means of a dedicated current sink 70, e.g., a load impedance or a trans-impedance amplifier, which is connected only when the LED driving current is interrupted by the first switch S1. The control signal for both switches S1, S2 is generated by the driver timing circuitry. The photo-induced current from the photo-diode flows through the current sink 70 when switches S2 and S3 are closed and develops voltage that is read by the controller 34.

With reference to FIG. 6, the photocurrent reading is obtained with a negative current I_PH and the LED driving is with a positive current I_LED.

The reading cycles may be synchronized with a PWM diming signal. The switch S1 may thus be used as a PWM diming switch.

FIG. 6 also shows an optional series diode 72 between the light sensitive components and the LED string 24. As the reading voltage is far below the LED forward voltage, there is no absolute need to isolate the LEDs during the reading cycle. However in order to prevent any leakage currents through the LED driver electronics and any lighting board protection components (like capacitors) during the reading cycle, one or more series diodes can be used. This guarantees that no currents flow which are independent of the light flux.

Figure 7:
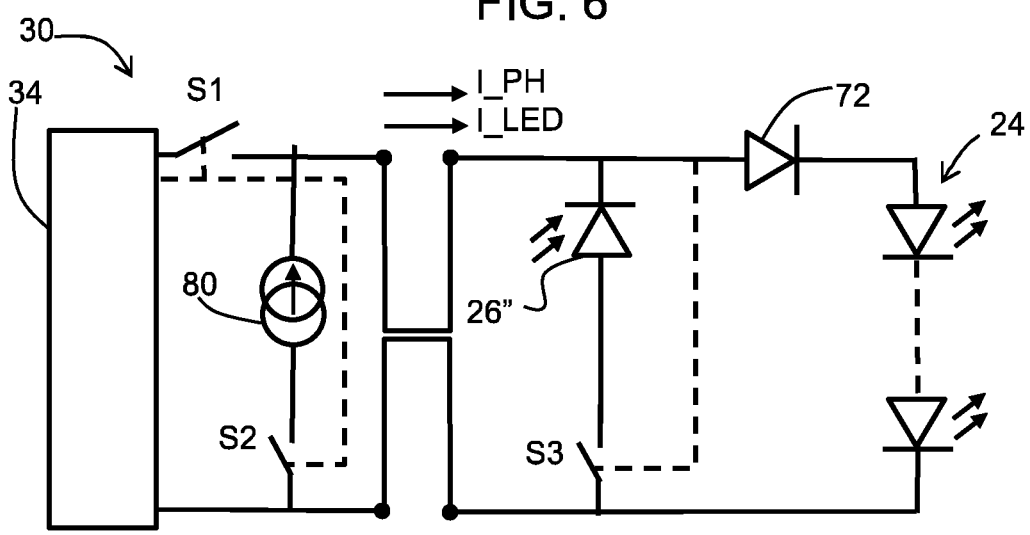
FIG. 7 shows an alternative lighting module design in which the light sensitive component comprises a photodiode in a different configuration.

In the circuit of FIG. 6, the photocurrent which is monitored has opposite polarity to the driving current. FIG. 7 shows an example in which the reading current has the same polarity as the driving current. This can be beneficial as the driver does not need to accommodate a negative current insertion.

In FIG. 7, the light sensitive component comprises a photodiode 26" with opposite polarity to the LEDs between the first and second terminals, so that the cathode of the photodiode connects to the anode of the LED string (through diode 72) and the anode of the photodiode connects to the cathode of the LED string (through the switch S3).

In this case, the current measurement may be implemented at a reduced driving voltage. The voltage is adjusted below e.g. 2V where the current through the LED string will be zero. This low voltage condition is the trigger for the series switch S3 to be activated to connect the photodiode 26" in reverse parallel connection to the LED string. A positive photodiode current I_PH flows. Under dark conditions the photodiode would not conduct any current.

The optional isolation diode 72 again ensures that the capacitances of protection devices (such as the protection diodes 60 in FIG. 5) would not slow down the voltage ramp in order to speed up the reading process.

In this example, the current flows to current sink 80 (again a load impedance or a trans-impedance amplifier) which is again connected only when the LED driving current is interrupted by the switch S1. The photo-induced current from the photo-diode flows through the current sink 80 when switches S2 and S3 are closed and develops voltage that is read by the controller 34. The control signal for both switches S1, S2 can again be generated by the driver timing circuitry and may e.g. be used as a PWM switch for LED dimming.

The examples above require additional hardware in the lighting driver, such as the switch S2.

The switch S2 can for example be omitted if the load or trans-impedance amplifiers 70, 80 are able to withstand the driving voltage of the LED module. The reading current is much smaller than the LED driving current and will not cause any problems when flowing in addition.

Figure 8:
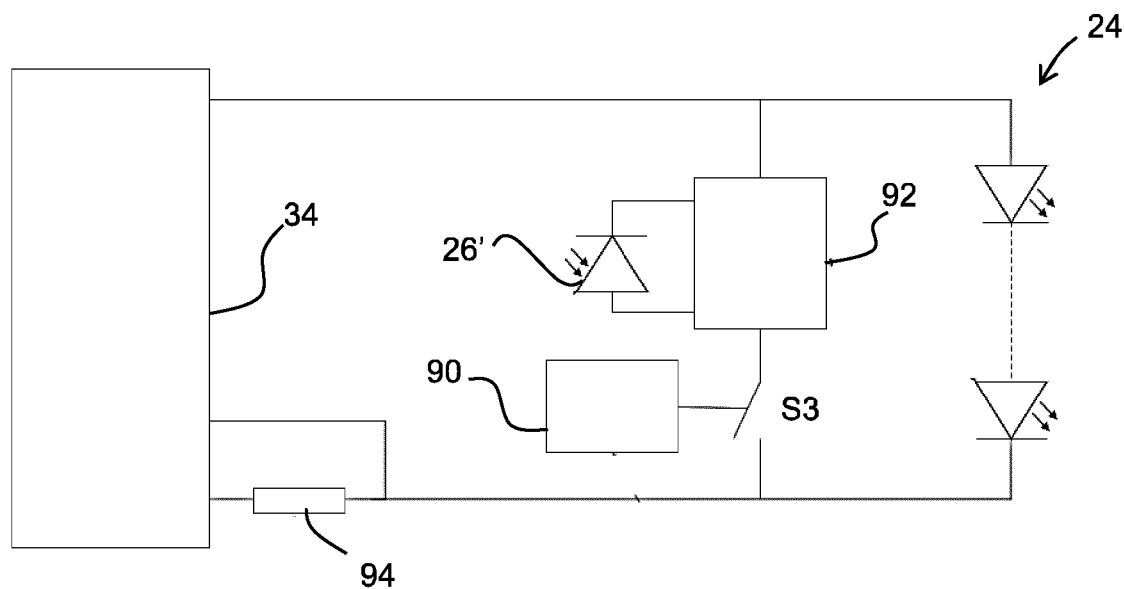
FIG. 8 shows a first modification to allow a driver side switch to be removed.

FIG. 8 shows an alternative approach to allow the switch S2 to be removed.

FIG. 8 shows a local oscillator 90 for generating a signal to control the switch S3 thereby modulating the driver output current with a current from the sensor element. The oscillator is used to drive the modulator switch S3 at a certain frequency. This simplifies the demodulation process in the driver circuit 34 since the photo-current is observed as a change from the steady-state LED current. A high-pass filter with cut-off frequency that passes the modulated signal can be used for this purpose.

An amplifier 92 amplifies the photocurrent delivered to it by the photodiode 26' such that it is large enough to be detected using a sense resistor 94. A sense voltage is detected in the driver circuit 34 and converted into equivalent lux level.

During the illumination mode, the switch S3 is isolating, under the control of the oscillator 90. For sensing, the switch S3 is closed. In accordance with one aspect of the invention, the LEDs are turned off during the sensing time when switch S3 is closed.

The LEDs may be off during this time because the drive voltage at this time (timed with the oscillator 90) is below the combined LED threshold voltage. When the driving voltage is below the burning voltage of the LEDs in this way (so they are off) there will be less noise in the measured current and the sensed signal can more easily be measured In such a case, the current measured is only from the sense element.

In accordance with another aspect, the current may be measured at the same time that the light source arrangement is emitting output light. For this purpose, the amplifier is used to make the influence of the photocurrent large enough to be detected in the total load current. The driver can then monitor its current (which is a common function of a LED driver) and variations of the frequency of the local oscillator in the driver are due to the amplified photocurrent.

The current fluctuations can thus be read during on or off periods of the LEDs when using the circuit of FIG. 8. The L2 board may thus keep generating light while sensing the incoming illumination level via the photodiode. This is different from the approaches described with reference to FIGS. 1 to 7 which make use of temporary interruption of light generation.

The switch S3 is used to modulate the LED current using the amplified photo-current.

This aspect may also make use of other sensor elements, not only the photodiode shown in FIG. 8. Other sensor elements may for example respond to radiofrequency signals, RF, for example generated by a microwave or radar signal.

Figure 9:
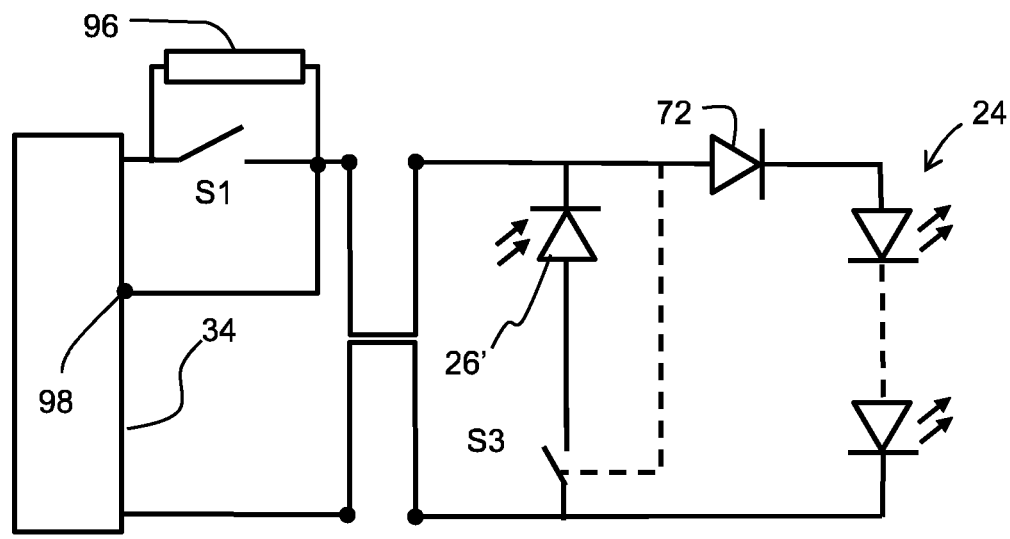
FIG. 9 shows a second modification to allow a driver side switch to be removed.

FIG. 9 shows an example in which the first switch S1 is in parallel with a read out resistor 96. The sensing mode is activated by opening the first switch S1. The LED driving voltage together with resistor 96 together form a current source.

When switch S1 is open, a current is delivered to the photodiode using a reduced drive voltage. The drive voltage is not sufficient to turn on the LED string, and this reduced voltage also results in the turn on off switch S3. The voltage drop across the resistor 96 is measured at terminal 98 and this is indicative of the photodiode current. The measurement of voltages when the are unknown series resistances (such as caused by the connections to the L2 board). Thus, the monitoring of current in this way is preferred, based on the related voltage drop across resistor 96 that is monitored at terminal 98.

Figure 10:
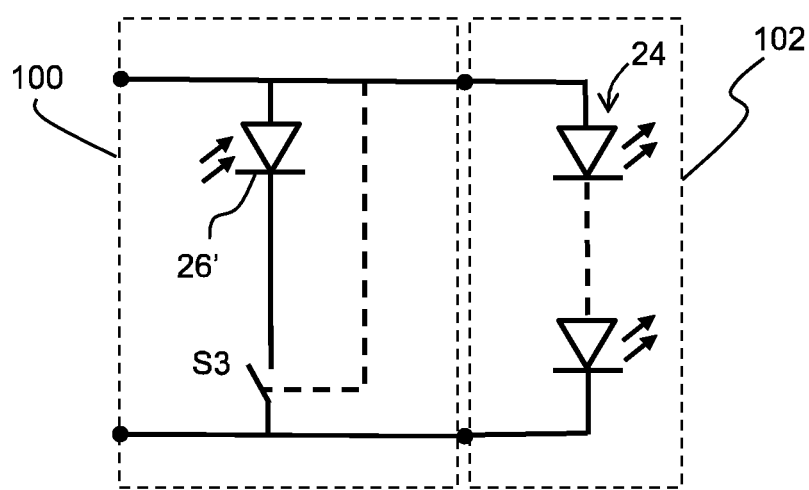
FIG. 10 shows that the sensing device may be separate to the L2 circuit board.

FIG. 10 shows that the sensing device 100 may be separate to the L2 circuit board 102 and may be connected between the L2 circuit board 102 and the lighting driver with a daisy chain connection. However, the L2 circuit board 102 and the sensing device 100 may together be considered to comprise a lighting module.

The sensing device may instead be connected in parallel with the L2 circuit board in a piggy pack.

The lighting module may include additional sensors such as temperature sensors.

The approach above may be used for high and low voltage drivers.

It will be clear from the examples above that the light sensitive component can be mounted on the L2 circuit board or on a separate PCB, connected to the L2 board by wires or in the driver.

The examples above are based on light sensing. However, the arrangement may be applied to other sensor elements (such as temperature, humidity, occupancy detection etc.) By timing the sensor readout with the off periods of the light source arrangement, interference from the drive signals to the light source arrangement are reduced.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A lighting arrangement, comprising:
   a lighting module, comprising:
      a terminal arrangement comprising first and second terminals for connection to a lighting driver;
      a light source arrangement in series between the first and second terminals; and
      a sensor element in parallel with the light source arrangement and in series between the first and second terminals;
   a measuring system for measuring, at the terminal arrangement, a signal which is dependent on the sensor element; and
   an isolating switch in series with the sensor element for disconnecting the sensor element when the light source arrangement is turned on.

2. The lighting arrangement as claimed in claim 1, wherein the measuring system is adapted to monitor the characteristics of a discharge from the light source arrangement through the sensor element when the light source arrangement is turned off.

3. The lighting arrangement as claimed in claim 2, wherein the measuring system comprises a measuring unit and a connection switch for connecting the measuring unit to the terminal arrangement.

4. The lighting arrangement as claimed in claim 1, wherein the measuring system is adapted to measure a discharge voltage over time or a current over time.

5. The lighting arrangement as claimed in claim 1, wherein the sensor element is a light sensitive component comprising:
   a light dependent resistor; or
   a phototransistor; or
   a photodiode with the same polarity between the first and second terminals as the light source arrangement; or
   a photodiode with an opposite polarity between the first and second terminals as the light source arrangement.

6. The lighting arrangement as claimed in claim 1, wherein the isolating switch is controlled by one or more voltages of the terminal arrangement.

7. The lighting arrangement as claimed in claim 1, wherein the isolating switch comprises:
   a transistor; or
   an opto-coupled switch; or
   a relay.

8. The lighting arrangement as claimed in claim 1, further comprising an amplifier connected to the sensor element and a modulation circuit, such that a modulated amplified sensing signal is provided to the terminal arrangement.

9. The lighting arrangement according to claim 1, wherein the lighting module comprises a sensor circuit in parallel with the light source arrangement, the sensor circuit comprising the sensor element, an amplifier and a modulation circuit for applying a modulated sensing signal to the terminal arrangement; and
   the measuring system for measuring, at the terminal arrangement, the signal which is dependent on the sensor element from the modulated sensing signal.

10. The lighting arrangement as claimed in claim 9, wherein the modulation circuit comprises a modulation switch for coupling an amplified sensor element signal to the terminal arrangement and a timing circuit for controlling the timing of operation of the modulation switch.

11. The lighting arrangement as claimed in claim 1, wherein the light source arrangement comprises a LED arrangement and the lighting driver comprises a LED driver.

12. A lighting system, comprising:
   a lighting driver; and
   a lighting arrangement as claimed in claim 1, wherein an output of the lighting driver is connectable to the terminal arrangement and wherein the measuring system is part of the lighting driver.

13. A lighting arrangement, comprising:
   a lighting module, comprising:
      a terminal arrangement comprising first and second terminals for connection to a lighting driver;
      a light source arrangement in series between the first and second terminals; and
      a sensor element in parallel with the light source arrangement and in series between the first and second terminals;
   a measuring system for measuring, at the terminal arrangement, a signal which is dependent on the sensor element;
   wherein the measuring system is adapted to monitor the characteristics of a discharge from the light source arrangement through the sensor element when the light source arrangement is turned off; and
   wherein the measuring system comprises a measuring unit and a connection switch for connecting the measuring unit to the terminal arrangement.

14. The lighting arrangement as claimed in claim 13, wherein the measuring system is adapted to measure a discharge voltage over time or a current over time.

15. The lighting arrangement as claimed in claim 13, wherein the sensor element is a light sensitive component comprising:
   a light dependent resistor; or
   a phototransistor; or
   a photodiode with the same polarity between the first and second terminals as the light source arrangement; or
   a photodiode with an opposite polarity between the first and second terminals as the light source arrangement.

16. The lighting arrangement as claimed in claim 13, further comprising an amplifier connected to the sensor element and a modulation circuit, such that a modulated amplified sensing signal is provided to the terminal arrangement.

17. The lighting arrangement according to claim 13, wherein the lighting module comprises a sensor circuit in parallel with the light source arrangement, the sensor circuit comprising the sensor element, an amplifier and a modulation circuit for applying a modulated sensing signal to the terminal arrangement; and
   the measuring system for measuring, at the terminal arrangement, the signal which is dependent on the sensor element from the modulated sensing signal.

18. The lighting arrangement as claimed in claim 17, wherein the modulation circuit comprises a modulation switch for coupling an amplified sensor element signal to the terminal arrangement and a timing circuit for controlling the timing of operation of the modulation switch.

19. The lighting arrangement as claimed in claim 13, wherein the light source arrangement comprises a LED arrangement and the lighting driver comprises a LED driver.

* * * * *